United States Patent [19]

Schlüsselbauer

[11] Patent Number: 6,000,904
[45] Date of Patent: Dec. 14, 1999

[54] APPARATUS FOR STORING AND CONVEYING STANDING, TUBULAR WORKPIECES MADE OF CONCRETE

[76] Inventor: Johann Schlüsselbauer, Obergmain 2, A-4674 Altenhof, Austria

[21] Appl. No.: 09/250,966

[22] Filed: Feb. 16, 1999

[30] Foreign Application Priority Data

Feb. 20, 1998 [AT] Austria ................................ A302/98

[51] Int. Cl.⁶ ................................................. B65G 57/02
[52] U.S. Cl. ...................... 414/792.9; 414/911; 414/910; 414/626; 294/81.52
[58] Field of Search ............................... 294/81.5, 81.52, 294/81.54, 81.1, 87.1; 414/792.9, 910, 908, 911, 626, 623, 267

[56] References Cited

U.S. PATENT DOCUMENTS

| | | | |
|---|---|---|---|
| 1,270,995 | 7/1918 | Weickel | 294/81.51 X |
| 3,044,819 | 7/1962 | Pierre | 294/81.51 |
| 3,302,967 | 2/1967 | Harris et al. | 294/81.1 X |
| 3,822,077 | 7/1974 | Palen | 294/81.51 X |
| 4,045,071 | 8/1977 | Dunstan | 294/81.51 X |
| 4,592,692 | 6/1986 | Suizu et al. | 414/792.9 X |
| 4,911,605 | 3/1990 | Berg | 294/87.1 X |

FOREIGN PATENT DOCUMENTS

| | | | |
|---|---|---|---|
| 1066933 | 10/1959 | Germany | 294/87.1 |
| 3009361 | 9/1981 | Germany | 414/792.9 |
| 000482 | 1/1982 | Japan | 414/792.9 |
| 6504399 | 6/1966 | Netherlands | 414/792.9 |
| 0779262 | 11/1980 | U.S.S.R. | 294/81.54 |

Primary Examiner—Janice L. Krizek
Assistant Examiner—Steven B. McAllister
Attorney, Agent, or Firm—Collard & Roe, PC.

[57] ABSTRACT

There is described an apparatus for storing and conveying standing, tubular workpieces (1) made of concrete in layers arranged one above the other, comprising a load pick-up device (6) to be connected to a hoist (2) and designed for at least two workpieces (1), which load pick-up device consists of a holding frame (11) extending above the workpieces (1) to be picked up and of holding arms (14) encompassing the workpieces (1) on the outside, which holding arms are mounted on the holding frame (11) so as to be movable transverse to the workpieces (1) and engage below a flange (15) of a bottom ring (16) of the workpieces (1), and comprising storage racks (21) to be coupled individually to the load pick-up device (6) and bridging the workpieces in the manner of a portal for accommodating the workpieces (1) in a further layer. To create advantageous constructional conditions it is proposed that one storage rack (21) bridging the workpieces (1) to be seized by the load pick-up device (6) can each be coupled with the load pick-up device (6).

4 Claims, 3 Drawing Sheets

APPARATUS FOR STORING AND CONVEYING STANDING, TUBULAR WORKPIECES MADE OF CONCRETE

FIELD OF THE INVENTION

This invention relates to an apparatus for storing and conveying standing, tubular workpieces made of concrete in layers arranged one above the other, comprising a load pick-up means to be connected to a hoist, which consists of a holding frame extending above the workpieces to be picked up and of holding arms encompassing the workpieces on the outside, which holding arms are mounted on the holding frame so as to be movable transverse to the workpieces and engage below a flange of a bottom ring of the workpieces, and comprising storage racks to be coupled individually to the load pick-up means and bridging the workpieces in the manner of a portal for accommodating the workpieces in a further layer.

DESCRIPTION OF THE PRIOR ART

When workpieces which were made of concrete in a molding means, such as concrete pipes, shaft rings or shaft cylinders, have been removed from the mold, these workpieces must temporarily be stored for curing the concrete, taking into account the restricted load-bearing capacity of the workpieces not yet cured. For this reason, the tubular workpieces can only be stored upright, which for a temporary storage in two or more layers one above the other requires storage racks bridging the workpieces of one layer, so that the workpieces can be deposited on the storage racks in a further layer, without applying an additional load onto the bottom layer of workpieces. To ensure that the workpieces to be cured can be deposited in layers by means of a hoist unimpeded by the storage racks, and can be lifted again upon curing, the storage racks must be erected and lifted off in dependence on the assembly and disassembly of the individual workpiece layers. To avoid an individual handling of the workpieces in favor of a groupwise handling of the workpieces, there is known a load pick-up means to be connected to a hoist, which consists of a holding frame extending above the workpiece group to be picked up and of holding arms encompassing the individual workpieces of the workpiece group on the outside. These holding arms are mounted in the holding frame so as to be movable transverse to the workpieces and engage below a flange of a metallic bottom ring, by means of which the respective workpiece can be lifted. By means of this known load pick-up means the workpieces can thus be seized in groups in a predetermined arrangement and be conveyed by means of the hoist, so that the respective workpiece group seized by the load pick-up means can temporarily be stored for curing or be moved away from the temporary store upon curing. Since the storage racks used in connection with such a load pick-up means are designed to accommodate one workpiece group each, as it can also be seized by the load pick-up means, additional conveying means for the storage racks can be omitted, when these storage racks can be coupled with the load pick-up means. For this purpose, pick-up girders parallel to the holding arms are provided for a storage rack to be coupled below a workpiece group picked up. It is, however, disadvantageous that a separate handling of the storage racks by means of the load pick-up means becomes inevitable, because first of all the storage racks must be lifted, before the workpieces can be seized by the load pick-up means. In this connection it should be considered that during the removal of the cured workpieces the handling thereof should not be impeded by a storage rack moving with the same. The cured workpieces can be deposited directly upon each other without the storage racks.

SUMMARY OF THE INVENTION

It is the object underlying the invention to improve an apparatus as described above for storing and conveying standing, tubular workpieces made of concrete with simple constructive means such that a separate handling of the storage racks becomes superfluous, and thus additional conveying routes during the handling of the storage racks can be omitted.

This object is solved by the invention in that one storage rack bridging the workpieces to be seized by the load pick-up means can each be coupled with the load pick-up means.

Due to the measure of coupling the load pick-up means with one storage rack each, which bridges the workpieces to be seized by the load pick-up means, a separate handling of the storage racks apart from the handling of the workpieces can largely be avoided, because the cured workpieces need not be liberated from the storage racks bridging the same prior to their handling. The cured workpieces can rather be seized and moved away individually or in groups together with the storage racks bridging the same, because depositing the workpieces seized by the load pick-up means together with a storage rack can easily be performed without the storage rack. For this purpose it is merely necessary to withdraw the holding arms of the load pick-up means from the annular flange of the bottom rings after the workpieces have been deposited, in order to remove the load pick-up means together with the rack coupled thereto from the deposited workpieces. By means of the hoist, the storage rack can therefore be placed above a workpiece group of a layer in order to build up a further workpiece layer above an already existing layer of workpieces to be cured, in order to be moved away together with this workpiece group only after this workpiece group bridged by the storage rack has cured.

Although in most applications the load pick-up means will be designed for seizing two or more workpieces at the same time, it may be quite advantageous in particular for very large and heavy workpieces to design the load pick-up means such that merely a single workpiece can be picked up. The advantages obtained by the simultaneous coupling of a storage rack bridging the workpiece are also maintained in such an embodiment.

Particularly simple constructional conditions are obtained when, in the position in which they are coupled with the load pick-up means, the storage racks, which have two parallel longitudinal bars for picking up workpieces disposed one beside the other in a row, protrude with their longitudinal bars between the holding arms of the load pick-up means disposed opposite each other in pairs with respect to the workpieces. Since for a safe accommodation of the bottom rings of the workpieces disposed one beside the other in a row the longitudinal bars of the storage racks have a mutual distance smaller than the diameter of the bottom rings, there is sufficient room for the arrangement of the holding arms outside the two longitudinal bars, without impairing the transverse movement of the holding arms so as to engage below the flange of the bottom rings. With the restriction to holding arms exclusively outside the two longitudinal bars of the storage racks, there is in addition obtained the advantageous possibility of not having to place the load pick-up means in the direction of the workpiece axes from the top onto the workpiece group to be picked up, but of pushing the same over the workpiece group in the direction of the workpiece row, when on the opposite sides of the two longitudinal bars of the storage rack bridging the workpiece group to be picked up the holding arms can be moved apart at least to a distance which corresponds to the outside diameter of the workpieces. The holding arms can be disposed on both sides of a storage rack coupled with the load pick-up means on longitudinal girders mounted in the storage rack so as to be movable with respect to each other, so that for seizing the workpieces of a workpiece group merely the longitudinal girders of the holding arms must be adjusted.

For coupling the load pick-up means with a storage rack, the holding frame of the load pick-up means may have coupling pins to be actuated via an actuator, which coupling pins engage in coupling recesses of the storage rack to be seized by the load pick-up means. The coupling connection by means of the coupling pins engaging in coupling recesses represents a simple construction, which requires a comparatively small control effort, so that the holding frames can simply be seized by the load pick-up means, independent of whether at the same time a single workpiece or a workpiece group should also be seized or not.

BRIEF DESCRIPTION OF THE DRAWING

In the drawing, the subject-matter of the invention is represented by way of example, wherein.

DESCRIPTION OF THE PREFERRED EMBODIMENT

Figure 1:
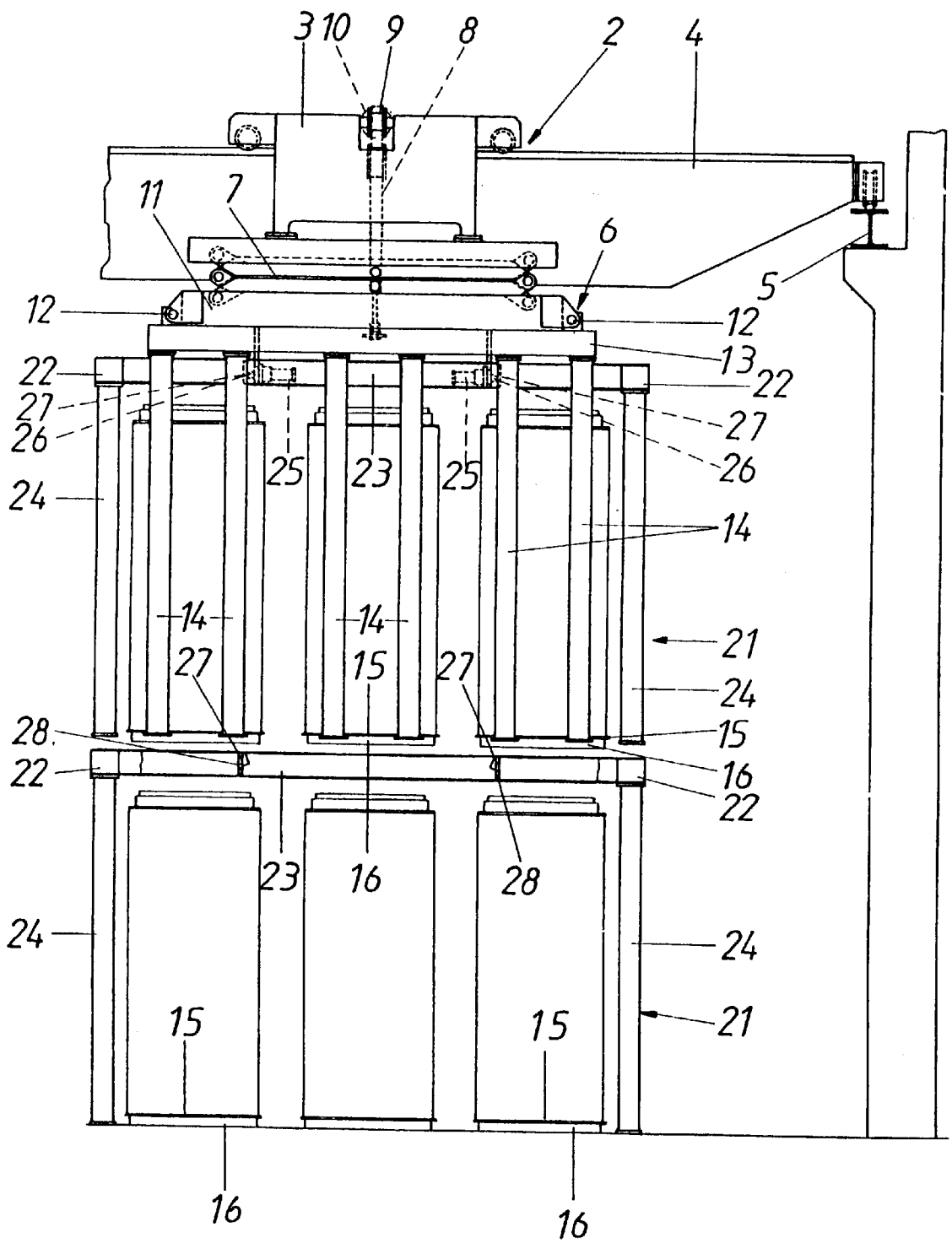
FIG. 1 shows segments of an inventive apparatus for storing and conveying standing, tubular workpieces made of concrete in at least two layers arranged one above the other, in a partly cut-away side view.

As can be taken in particular from FIG. 1, the temporary store for curing tubular workpieces 1 made of concrete, which is illustrated in segments, is provided with a hoist 2 in the form of a travelling crane, whose trolley 3 is mounted on a crane girder 4 bridging the temporary store, which crane girder can be moved along the temporary store on crane rails 5. To the trolley 3 a load pick-up means 6 is connected via shear rods 7, by means of which the load pick-up means 6 is guided parallel to itself so as to be vertically adjustable. For lifting the load pick-up means 6 a traction mechanism 8 is used, for instance a sprocket chain moving over deflection wheels 9, one of which can be adjusted by means of a lifting cylinder 10. When the piston rod of the lifting cylinder 10 is extended, the load pick-up means 6 is lifted.

Figure 3:
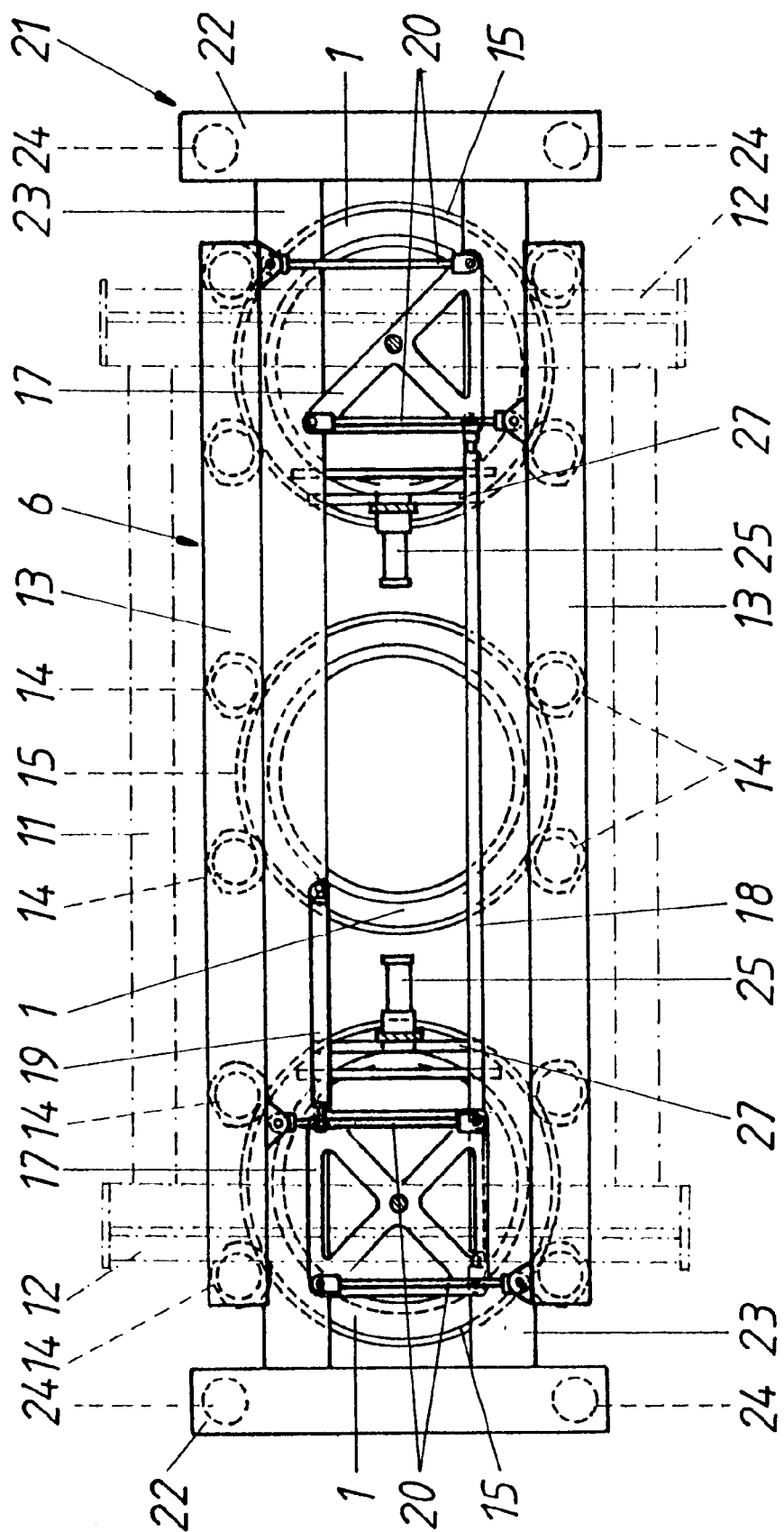
FIG. 3 shows this apparatus in a section along line III—III of FIG. 1 on an enlarged scale.

The load pick-up means 6 has a holding frame 11 pivotally mounted at the shear rods 7 and connected with the traction mechanism 8, which holding frame constitutes a frame with sliding guideways 12 for two longitudinal girders 13, at which holding arms 14 are provided, which extend parallel to the axis of the tubular workpieces 1. These holding arms encompass the tubular workpieces 1 on the outside and engage below the radially outwardly protruding annular flange 15 of a metallic bottom ring 16 associated to each workpiece 1, by means of which the workpieces 1 can be lifted. For engaging below the annular flanges 15, the holding arms 14 disposed opposite each other in pairs with respect to each workpiece 1 must be displaced with respect to each other by moving the longitudinal girders 13 with respect to each other on the guideways 12. As can be taken from FIG. 3, two rotary members 17 are rotatably mounted for this purpose in the holding frame 11, which rotary members are in drive connection with each other via a coupling rod 18 and can be swivelled via an adjusting cylinder 19. These rotary members 17 are pivotally mounted at the two longitudinal girders 13 via connecting rods 20, so that by means of a rotary adjustment of the rotary members 17 by actuating the adjusting cylinder 19 the longitudinal girders 13 with the holding arms 14 are moved on the sliding guideways 12 in diametrically opposite directions. It is thus easily possible that the workpieces 1 disposed one beside the other in a row are seized by the load pick-up means 6, because the load pick-up means 6 need merely be moved over the group of workpieces 1 to be picked up by means of the travelling crane, before the holding arms 14 are adjusted transverse to the row of workpieces 1, so as to engage below the annular flange 15 of the bottom rings 16 of the workpieces 1 and then lift the seized workpiece group by means of the lifting cylinder 10, whereupon the seized workpiece group can be conveyed by means of the travelling crane corresponding to the production sequence.

Figure 2:
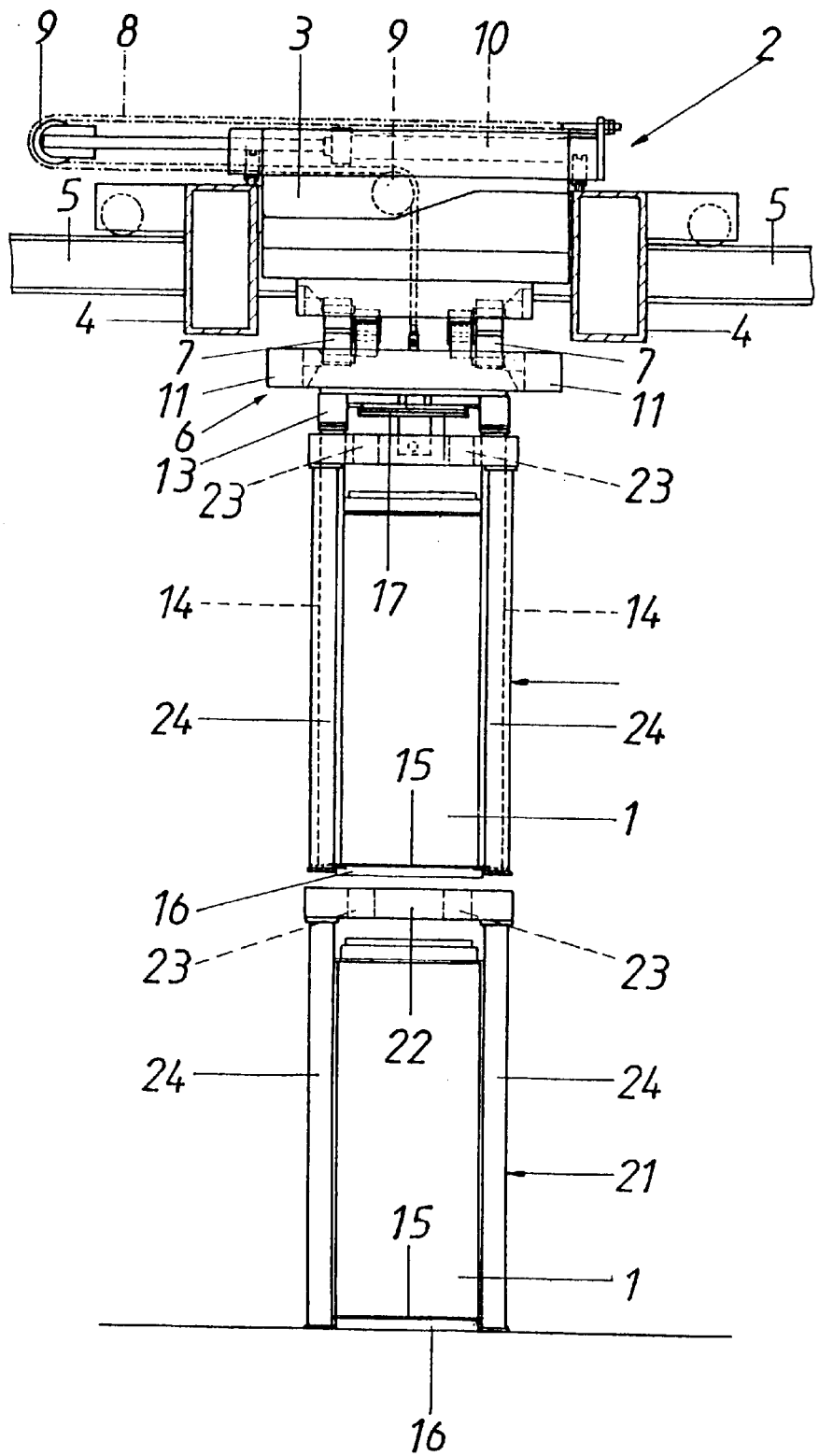
FIG. 2 shows this apparatus in an end view.

For depositing the workpieces 1 for curing purposes in two or more layers one above the other in the temporary store, the workpieces 1 of the respectively bottom layer must be bridged by storage racks 21, on which the respectively upper layer of workpieces can be deposited. These storage racks 21 consist of two longitudinal bars 23, which are disposed between two terminal transverse girders 22 and on which the bottom rings 16 of the workpieces I are supported. The transverse girders 22 are supported via lateral studs 24, whose distance from each other is larger than the outside diameter of the workpieces 1, so that the storage racks 21 can be conveyed over the workpieces 1 both from the top in the direction of the workpieces axes and transverse thereto in the direction of the workpiece rows, so that the workpieces are bridged in groups in the manner of a portal by the storage racks 21, as can be taken in particular from FIGS. 1 and 2. The mutual distance of the longitudinal bars 23 of the storage racks 21 has been chosen such that the longitudinal bars 23 are accommodated between the holding arms 14 disposed opposite each other in pairs with respect to the workpieces 1, without impeding the transverse adjustment thereof. By means of this measure it is easily possible to connect the storage racks 21 with the holding frame 11 of the load pick-up means 6 in a position in which the storage rack 21 coupled with the load pick-up means 6 bridges the workpiece group to be seized by the load pick-up means 6 in the manner of a portal, as is represented in the drawing. For coupling the storage racks 21 to the holding frame 11 of the load pick-up means 6 there are used actuators 25 for coupling pins 26 mounted on the holding frame 11, which coupling pins engage in coupling recesses 27 of the storage racks 21. These coupling recesses 27 are provided in crossbars 28 between the longitudinal bars 23 of the storage racks 21. By means of the actuators 25, the storage racks 21 can thus be coupled with or uncoupled from the load pick-up means 6.

In accordance with the illustrated embodiment, the workpieces 1 made of concrete in a molding means are deposited in two layers in a temporary store after they have been removed from the mold so as to cure the concrete, where the bottom layer of the workpieces I disposed one beside the other is bridged in groups by storage racks 21, on which the workpieces 1 of the upper layer are deposited. Since the load pick-up means 6 can pick up not only a workpiece group, but also a storage rack 21, namely in a position bridging the workpieces 1 picked up, conveying steps of the travelling crane exclusively designed for handling the storage racks 21 can largely be avoided. The cured workpieces 1 can be removed from the temporary store individually or in groups together with the storage racks 21 bridging the same, so as to create space for freshly manufactured workpieces to be cured. Depositing the removed, cured workpieces 1 is not impeded although the storage rack 21 has been conveyed together with the same, so that the storage rack 21 coupled to the load pick-up means 6 can be conveyed into the temporary store together with workpieces 1 to be newly picked up and cured.

I claim:

1. An apparatus for storing and conveying standing, tubular workpieces made of concrete in layers disposed one above the other, comprising a load pick-up means to be connected to a hoist, which consists of a holding frame extending above the workpieces to be picked up and of holding arms encompassing the workpieces on the outside, which holding arms are mounted on the holding frame so as to be movable transverse to the workpieces and engage below a flange of a bottom ring of the workpieces, and comprising storage racks to be coupled individually to the load pick-up means and bridging the workpieces in the manner of a portal for accommodating workpieces in a further layer, characterized in that one storage rack (21) bridging the workpieces (1) to be seized by the load pick-up means (6) can each be coupled with the load pick-up means (6).

2. The apparatus as claimed in claim 1, characterized in that in the position in which the storage rack is coupled with the load pick-up means (6), the storage rack (21), which has two parallel longitudinal bars (23) for supporting workpieces (1) disposed one beside the other in a row, protrudes with its longitudinal bars (23) between the holding arms (14) of the load pick-up means (6) disposed opposite each other in pairs with respect to the workpieces (1).

3. The apparatus as claimed in claim 1, characterized in that the holding arms (14) are disposed on longitudinal girders (13) on both sides of the storage rack (21) coupled with the load pick-up means (6), which longitudinal girders are mounted in the holding frame (11) so as to be movable with respect to each other.

4. The apparatus as claimed in any of claim 1, characterized in that the holding frame (11) of the load pick-up means (6) has coupling pins (26) to be actuated via an actuator (25), which coupling pins engage in coupling recesses (28) of the storage racks (21).

* * * * *